United States Patent [19]

Christensen

[11] 4,074,407
[45] Feb. 21, 1978

[54] METHOD FOR MAKING A HOLLOW-BODIED CASTER WHEEL

[75] Inventor: Carl O. Christensen, Alamo, Calif.

[73] Assignee: Roll-Rite Corporation, Oakland, Calif.

[21] Appl. No.: 778,486

[22] Filed: Mar. 17, 1977

[51] Int. Cl.² .............................................. B21D 53/26
[52] U.S. Cl. ..................................... 29/159 R; 29/447
[58] Field of Search .................. 29/159 R, 447, 527.5; 164/94, 95

[56] References Cited

U.S. PATENT DOCUMENTS

| 1,947,462 | 2/1934 | Doorbar | 29/447 |
| 2,016,435 | 10/1935 | Isidin | 29/447 |
| 2,734,778 | 2/1956 | Cook | 29/159 R X |
| 2,798,141 | 7/1957 | Longacre | 29/447 X |
| 2,921,344 | 1/1960 | Carrico | 29/159 R X |
| 4,035,895 | 7/1977 | Lester | 29/447 X |

Primary Examiner—Victor A. DiPalma
Attorney, Agent, or Firm—Phillips, Moore, Weissenberger, Lempio & Majestic

[57] ABSTRACT

A hollow-bodied caster wheel is produced by casting a pair of wheel body halves with flanges which do not fit over one another at equal temperatures, cooling the inner half while keeping the outer half hot, fitting the two halves over one another in that condition, and then allowing the temperatures of the two halves to become equalized so as to cause the flanges of the two halves to bond together as the outer half shrinks during cooling. A tire is then vulcanized over the outer surfaces of the assembled wheel body halves, and bearings are press-fitted into the inner surfaces of the assembled wheel body halves to complete the wheel.

2 Claims, 5 Drawing Figures

METHOD FOR MAKING A HOLLOW-BODIED CASTER WHEEL

BACKGROUND OF THE INVENTION

In a number of applications, such as in food handling and other circumstances where cleanliness of equipment is important, it is desirable to build caster wheels in such a way that the tire and hub when assembled together, form a relatively recess-free surface which is easy to clean. This objective is normally accomplished by providing a hollow wheel of generally rectangular cross-section whose width is generally equal to the width of the tire which is vulcanized onto the rolling surface of the wheel. In the highly competitive caster industry, it is imperative to manufacture a caster conforming to these requirements at the least possible cost.

Currently, two principal ways of manufacturing a wheel of this type are in use: stamping followed by press-fitting (which is undesirable because the press-fit tends to work loose in use), and stamping followed by welding. In the first method, two generally symmetrical halves of the wheel are stamped from flat stock by a series of successive stamping operations, and then press-fitted together. In the second method, two identical stampings forming the two havles of the outer portion of the wheel, and a sleeve forming the hub portion of the wheel, are all welded together to form a unitary hollow wheel. In either method, a subsequent plating operation is often necessary to produce an estehtically acceptable wheel body surface.

In view of the need for cost-effective manufacture of high-quality caster wheels for the above-mentioned applications, it has therefore become necessary to devise a wheel body structure of the type described which lends itself to easy assembly in a single step without further processing, yet provides a sturdy, well-sealed hollow wheel body.

SUMMARY OF THE INVENTION

In accordance with the invention, a wheel body of the type described is manufactured by precision molding or die-casting the two halves of the wheel from aluminum, allowing the inner half to cool, and dropping the outer half over it while still hot. As the outer half cools, it shrinks into an extremely tight, solid fit with the inner half. By selecting appropriate grades of aluminum or other materials, and appropriate surface finishes on the molds, no further manufacturing operations other than the vulcanizing of the tire and the insertion of the wheel bearings are required.

It is therefore the object of the invention to provide a wheel construction for hollow-bodied caster wheels which produces a sturdy, unitary, and esthetically satisfactory wheel body in a single, simple manufacturing operation.

It is another object of the invention to provide a method of manufacturing a caster wheel by precision molding or die-casting the wheel in two halves, cooling the inner half, dropping the outer half over the inner half while still hot, and allowing the outer half to shrink tightly onto the inner half as it cools.

DESCRIPTION OF THE PREFERRED EMBODIMENT

Figure 1:
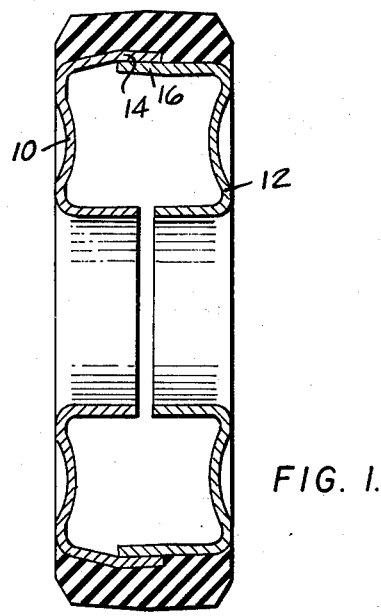
FIG. 1 is a sectional view showing a prior art caster wheel construction.
Figure 2:
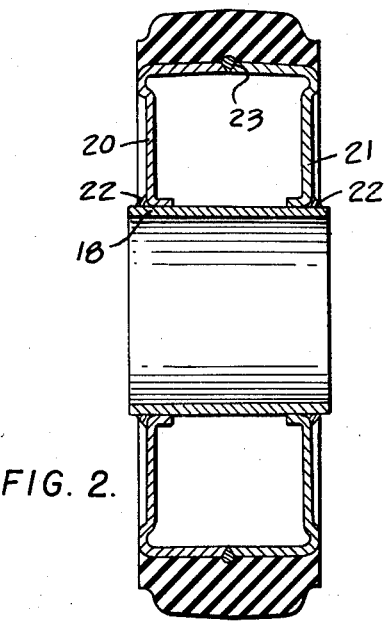
FIG. 2 is a sectional view showing another prior art caster wheel construction.

FIGS. 1 and 2 show, respectively, the currently used methods of making hollow caster wheel bodies by stamping (FIG. 1) and welding (FIG. 2). It will be noted that in order to produce the press-fitted wheel halves 10, 12 of FIG. 1, separate stamping operations have to be performed to form the blank itself, the outer flange 14, and the inner flange 16. The three-part wheel body of FIG. 2 requires two assembly operations in which the stampings 20, 21 are welded together at 23, and the hub sleeve 18 is then welded, as at 22, to the stampings, 20, 21 forming the outer portion of the wheel body.

It is therefore desirable to build the wheel body in such a manner as to make it capable of being formed and assembled with a minimum of effort, while at the same time obviating the need for a plating operation.

Figure 3:
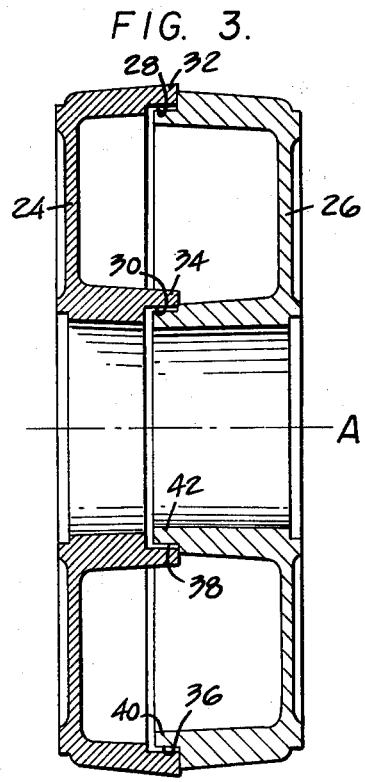
FIG. 3 is a sectional view showing a hot outer wheel half casting assembled with a cold inner wheel half casting to form a caster wheel body in accordance with the invention.
Figure 4:
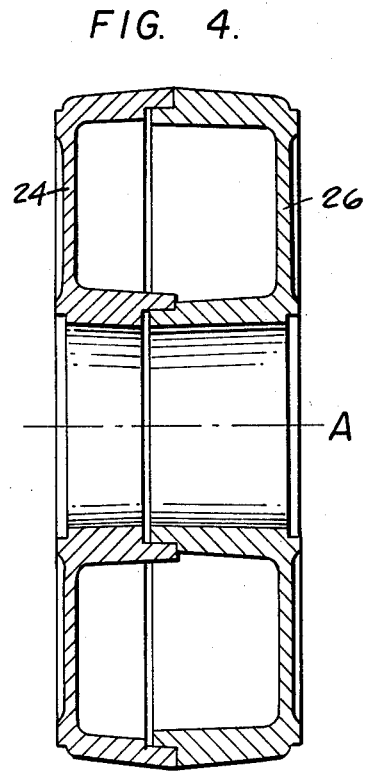
FIG. 4 is a sectional view showing the wheel body of FIG. 3 after cooling.
Figure 5:
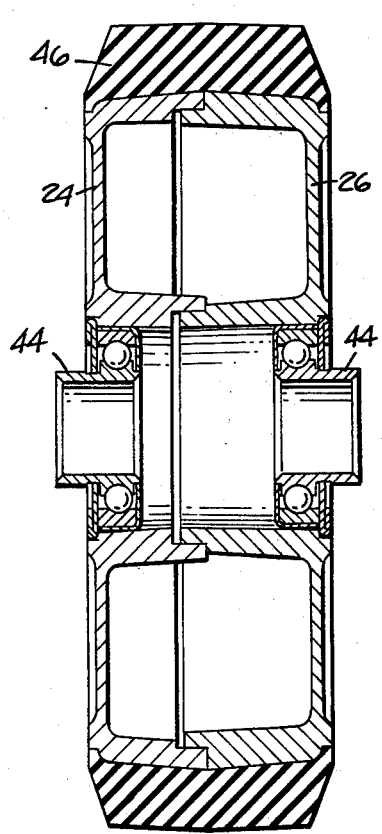
FIG. 5 is a sectional view showing a completed caster wheel manufactured in accordance with the invention.

These objectives are accomplished in accordance with the invention, as shown in FIGS. 3 through 5, by casting two wheel body halves 24, 26 (FIG. 3) in such a manner that the inside surfaces 28, 30 of the flanges 32, 34 of the outer half 24 are slightly closer to the wheel axis A than the outside surfaces 36, 38 of the flanges 40, 42 of the inner half 26. Thus, the outer half 24 does not normally fit over the inner half 26 of the wheel body.

In order to assemble the wheel of the invention, the outer half 24 is maintained at an elevated temperature (e.g. about the temperature at which it is taken from the casting mold), while the inner half 26 is allowed to cool to room temperature. The resultant shrinkage of inner half 26 is sufficient to bring surfaces 36, 38 closer to axis A than surfaces 28, 30. In this condition, the flanges 32, 34 of the outer half 24 of the wheel body readily slip over the flanges 40, 42 of the inner half 26 (FIG. 4).

As the outer half 24 also cools to room temperature, it shrinks sufficiently to cause surfaces 28, 30 and 36, 38, respectively, to become tightly bonded to each other in a sturdy, uniform bond. The hub 44 (FIG. 5) and tire 46 can now be press-fitted and vulcanized, respectively, onto the completed wheel body in a manner well-known in the art. The heating involved in the vulcanizing operation is not sufficient to separate the two wheel halves, particularly because the vulcanizing heat is applied equally to both halves so that both halves will expand with no significant effect on the bond formed by the shrink fit.

I claim:

1. A method of making a hollow-bodied caster wheel from castings forming an outer and an inner wheel body half respectively, each said half having generally cylindrical flanges coaxial with the axis of said wheel, the inner surface of said flanges on said outer half being slightly closer to said axis than the outer surface of said flanges on said inner half when said halves are at the same temperature, comprising the steps of:

a. causing said inner half to assume a sufficiently low temperature and said outer half to assume a sufficiently high temperature to cause said outer surface to be closer to said axis than said inner surface;
b. placing said flanges of said outer half axially over said flanges of said inner half while said halves are at said differing temperatures; and
c. allowing said halves to assume equal temperatures.

2. The method of claim 1, further comprising the steps of:
d. vulcanizing a tire onto said wheel body following said last-named step; and
e. fitting bearings to the inside surfaces of the flanges of both of said wheel body halves.

* * * * *